(12) United States Patent
Kimura et al.

(10) Patent No.: US 10,798,295 B2
(45) Date of Patent: Oct. 6, 2020

(54) ELECTRONIC DEVICE, IMAGE CAPTURE METHOD, AND CONTROL DEVICE

(71) Applicant: SHARP KABUSHIKI KAISHA, Sakai, Osaka (JP)

(72) Inventors: Kenji Kimura, Sakai (JP); Koichi Yamaguchi, Sakai (JP); Mitsuhiro Haneda, Sakai (JP); Akihiro Kodama, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/398,124

(22) Filed: Apr. 29, 2019

(65) Prior Publication Data

US 2019/0342490 A1    Nov. 7, 2019

(30) Foreign Application Priority Data

May 7, 2018 (JP) .................. 2018-089317

(51) Int. Cl.
*H04N 5/232* (2006.01)
*H04N 9/73* (2006.01)
*G03B 13/36* (2006.01)

(52) U.S. Cl.
CPC ......... *H04N 5/23218* (2018.08); *G03B 13/36* (2013.01); *H04N 9/735* (2013.01)

(58) Field of Classification Search
CPC ..... H04N 5/23218; H04N 9/735; G03B 13/36
See application file for complete search history.

(56) References Cited

U.S. PATENT DOCUMENTS

| | | | |
|---|---|---|---|
| 2008/0170129 A1 | 7/2008 | Yi et al. | |
| 2009/0207298 A1* | 8/2009 | Kawanishi | H04N 5/23212 348/345 |
| 2011/0032377 A1 | 2/2011 | Kim et al. | |
| 2013/0242113 A1* | 9/2013 | Tanaka | H04N 5/23296 348/169 |
| 2013/0258167 A1* | 10/2013 | Gum | H04N 5/23212 348/349 |
| 2013/0265484 A1* | 10/2013 | Hasegawa | H04N 5/23212 348/349 |
| 2016/0073030 A1* | 3/2016 | Park | H04N 5/23293 348/207.11 |

FOREIGN PATENT DOCUMENTS

| | | |
|---|---|---|
| CN | 101242494 A | 8/2008 |
| CN | 101998038 A | 3/2011 |
| JP | 2009-089220 A | 4/2009 |

* cited by examiner

*Primary Examiner* — Gevell V Selby
(74) *Attorney, Agent, or Firm* — ScienBiziP, P.C.

(57) ABSTRACT

An electronic device (1) includes a control device (10) configured to carry out: image capture operation determination processing in which a first subject is determined without a user operation and image capture timing is determined; and autofocus processing in which a second subject is determined without a user operation and an image capture device is controlled to focus on the second subject, the autofocus processing being commenced before the image capture operation determination processing finishes.

10 Claims, 4 Drawing Sheets

FIG. 4

ELECTRONIC DEVICE, IMAGE CAPTURE METHOD, AND CONTROL DEVICE

This Nonprovisional application claims priority under 35 U.S.C. § 119 on Patent Application No. 2018-089317 filed in Japan on May 7, 2018, the entire contents of which are hereby incorporated by reference.

TECHNICAL FIELD

The present invention relates to an electronic device, an image capture method, and a control device.

BACKGROUND ART

In conventionally known art, an image capture device automatically determines the timing of image capture. For example, Patent Literature 1 discloses an image capture device which is capable of obtaining a still image having a more preferable composition during image pickup of a moving image.

CITATION LIST

Patent Literature

[Patent Literature 1]
Japanese Patent Application Publication Tokukai No. 2009-89220 (Publication date: Apr. 23, 2009)

SUMMARY OF INVENTION

Technical Problem

Unfortunately, conventional techniques such as that described above have the problem that image capture processing requires a large amount of time because focusing on a subject which is a focus target is carried out after the subject is determined. In addition, the user needs to designate a subject which is to be focused on by the image capture device. This can be inconvenient for the user.

An aspect of the present invention has been made in view of the above-mentioned problems. An object of the present invention is to provide an electronic device capable of shortening the time until image capture, and to eliminate effort required for the user to designate a subject.

Solution to Problem

In order to solve the above problem, an electronic device in accordance with an aspect of the present invention includes: at least one image capture device; and at least one control device configured to carry out the following: detection of one or more objects in an image obtained from the at least one image capture device; image capture operation determination processing in which (i) a first subject is determined from among the one or more objects, without a user designating an object to be to the first subject, and (ii) timing of image capture is determined in accordance with a state of the first subject; and autofocus processing in which (i) a second subject is determined from among the one or more objects, without the user designating an object to be the second subject, and (ii) the at least one image capture device is controlled to focus on the second subject, the autofocus processing being commenced before the image capture operation determination processing finishes.

Advantageous Effects of Invention

An aspect of the present invention makes it possible to provide an electronic device capable of shortening the time until image capture processing. An aspect of the present invention makes it possible to eliminate effort required for a user to designate a subject.

DESCRIPTION OF EMBODIMENTS

The following description will discuss embodiments of the present invention with reference to FIGS. 1 to 4.

Embodiment 1

First, an embodiment of the present invention is discussed with reference to FIGS. 1 to 3. Described in the present embodiment is an electronic device capable of shortening the time until image capture processing.

[1. Configuration of Electronic Device 1]

Figure 1:
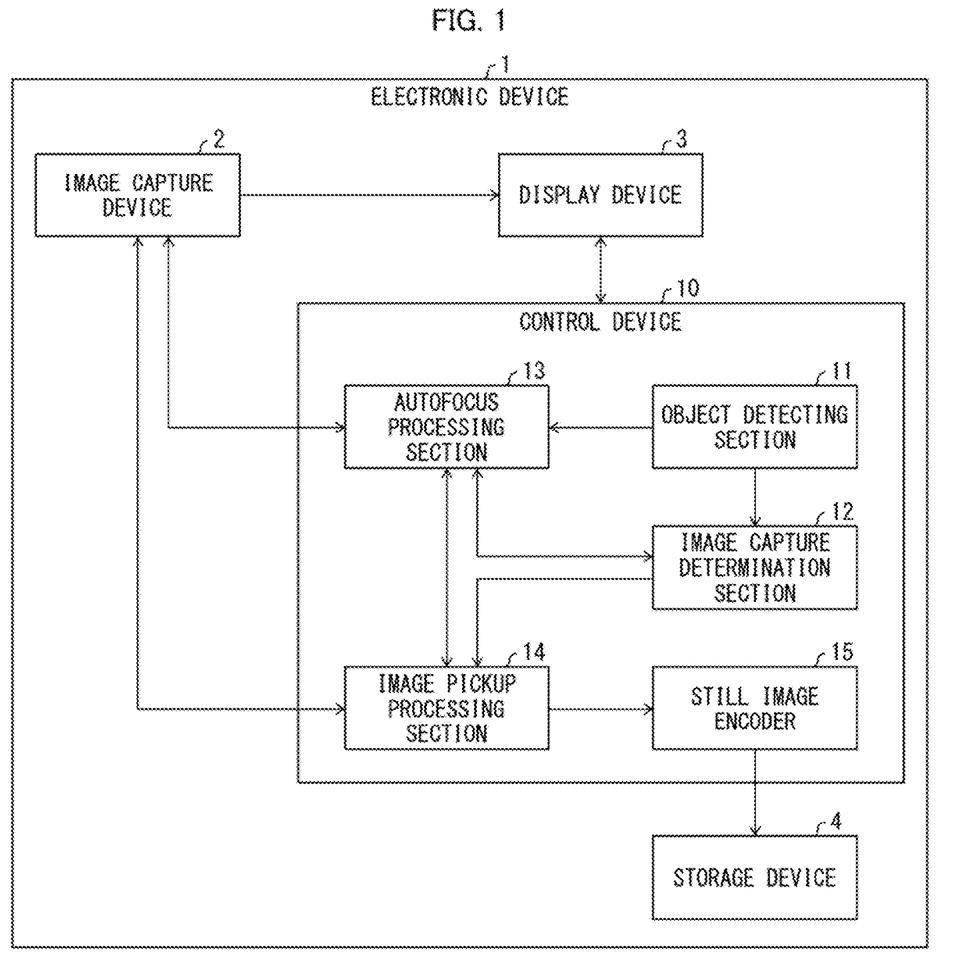
FIG. 1 is a functional block diagram illustrating an electronic device in accordance with Embodiment 1.

FIG. 1 is a functional block diagram illustrating an electronic device 1 in accordance with Embodiment 1. The electronic device 1 may be, for example, a smart phone, a digital camera, or the like. As illustrated in FIG. 1, the electronic device 1 comprises an image capture device 2, a control device 10, a display device 3, and a storage device 4.

Image capture device 2 is a camera used for capturing a still image. Note that the image capture device 2 may be capable of capturing a moving image.

The control device 10 is a control device for carrying out comprehensive control of the entire electronic device 1. The control device 10 includes an object detecting section 11, an image capture determination section (image capture operation determination processing section) 12, an autofocus processing section 13, an image pickup processing section 14, and a still image encoder 15.

The control device 10 may have a function of carrying out, as a part of image capture processing, autoexposure processing for automatically adjusting exposure of the image capture device 2. The control device 10 may have a function of carrying out, as a part of image capture processing, auto white balance processing for automatically adjusting the color temperature in an image to be captured by the image capture device 2.

The object detecting section 11 detects an object in an image obtained from the image capture device 2. The object detecting section 11 also detects a state of the object. Examples of the state of the object include the following.

A position of the object, i.e., coordinates of the object in the image.

A size of the object.

A type of object, i.e., whether the object is a person, an animal, food, scenery, etc.

A status of the object; for example, if the object is a person, whether or not the person is smiling, or whether or not the person is looking at the camera.

The image capture determination section 12 carries out processing in which (i) a first subject to serve as a basis for image capture timing for the image capture device 2 is determined, and (ii) the image capture timing is determined in accordance with a state of the first subject. Herein, this processing carried out by the image capture determination section 12 is referred to as image capture operation determination processing.

The image capture determination section 12 also determines whether or not a degree to which the first subject and the second subject (described later) match satisfies a predetermined condition. Note here that a case where the degree to which the subjects match satisfies a predetermined condition refers to (i) a case in which it is inferred that the subjects are the same object, or (ii) a case where respective regions occupied by the subjects in images obtained from the image capture device 2 overlap by a predetermined amount/ratio or more, such that the subjects can be deemed to be substantially the same object.

A method by which the image capture determination section 12 determines whether or not the degree to which the subjects match is not particularly limited. For example, it is possible to carry out this determination by determining whether or not the respective contour lines of the subjects are within a predetermined distance from each other, or whether or not the region encompassed by one contour line includes a region encompassed by another contour line.

The autofocus processing section 13 carries out processing for determining a second subject which is to be an autofocus target. The autofocus processing section 13 also carries out processing for focusing the image capture device 2 on the second subject. Herein, these two types of processing carried out by the autofocus processing section 13 are collectively referred to as "autofocus processing".

The first subject and the second subject are determined in accordance with a state of an object detected by the object detecting section 11, but a condition used for determining each of these subjects is not limited to a particular condition. Differing respective conditions may be used for determining the first subject and the second subject. Examples of conditions which can be used for determining the subjects include the following.

Whether or not the object is the largest object in the picked up image.

Whether or not the object is positioned closest to center in the picked up image.

Whether or not the object is a person.

The condition for detecting an object and the condition for determining a subject, as used by the object detecting section 11, the image capture determination section 12, and the autofocus processing section 13, may be set automatically in accordance with the surrounding image capture environment. These conditions may also be set by a user. Note, however, that the actual processing carried out by the object detecting section 11, the image capture determination section 12, and the autofocus processing section 13 is carried out without a user operation being performed to provide instruction to carry out the processing. Specific examples of such a user operation include a user operation for designating an object in the picked up image.

The image pickup processing section 14 carries out processing to control the image capture device 2 to carry out image pickup, and processing to control the image capture device 2 to capture a still image in accordance with an instruction from the image capture determination section 12. In the present specification, the term "image pickup" is used to refer to a case where an image is not saved in the storage device 4, whereas the term "image capture" is used to refer to a case where a still image is saved in the storage device 4. The image pickup processing section 14 also supplies, to the still image encoder 15, a signal indicating an image captured by the image capture device 2.

The still image encoder 15 encodes the signal received from the image pickup processing section 14 and causes the storage device 4 to store the signal thus encoded.

The display device 3 is a display panel that displays a still image or a moving image. The display device 3 may display icons, etc. which indicate, for example, the remaining battery level of the electronic device 1 or parameter settings of the image capture device 2, the objects being superimposed on the still image or the moving image as appropriate.

The storage device 4 is a storage device for saving various data such as captured image data. The storage device 4 may be a storage medium that is removable from the electronic device 1. The storage device 4 may be a member which is provided externally to the electronic device 1, and which acquires a captured image to be saved via wireless communication with the electronic device 1.

The electronic device 1 includes a button, a slider, and/or the like (not shown in FIG. 1) for receiving a user operation. It should be noted that a configuration may be employed in which the display device 3 functions as a touch panel which allows a user operation for the electronic device 1 to be carried out in the form of a touch operation carried out on the display device 3.

The respective members of the electronic device 1 are not limited to being single in number. That is, each member may be plural in number. Part or all of the processing carried out by each member may be carried out by another member.

[2. Flow of Processing]

Figure 2:
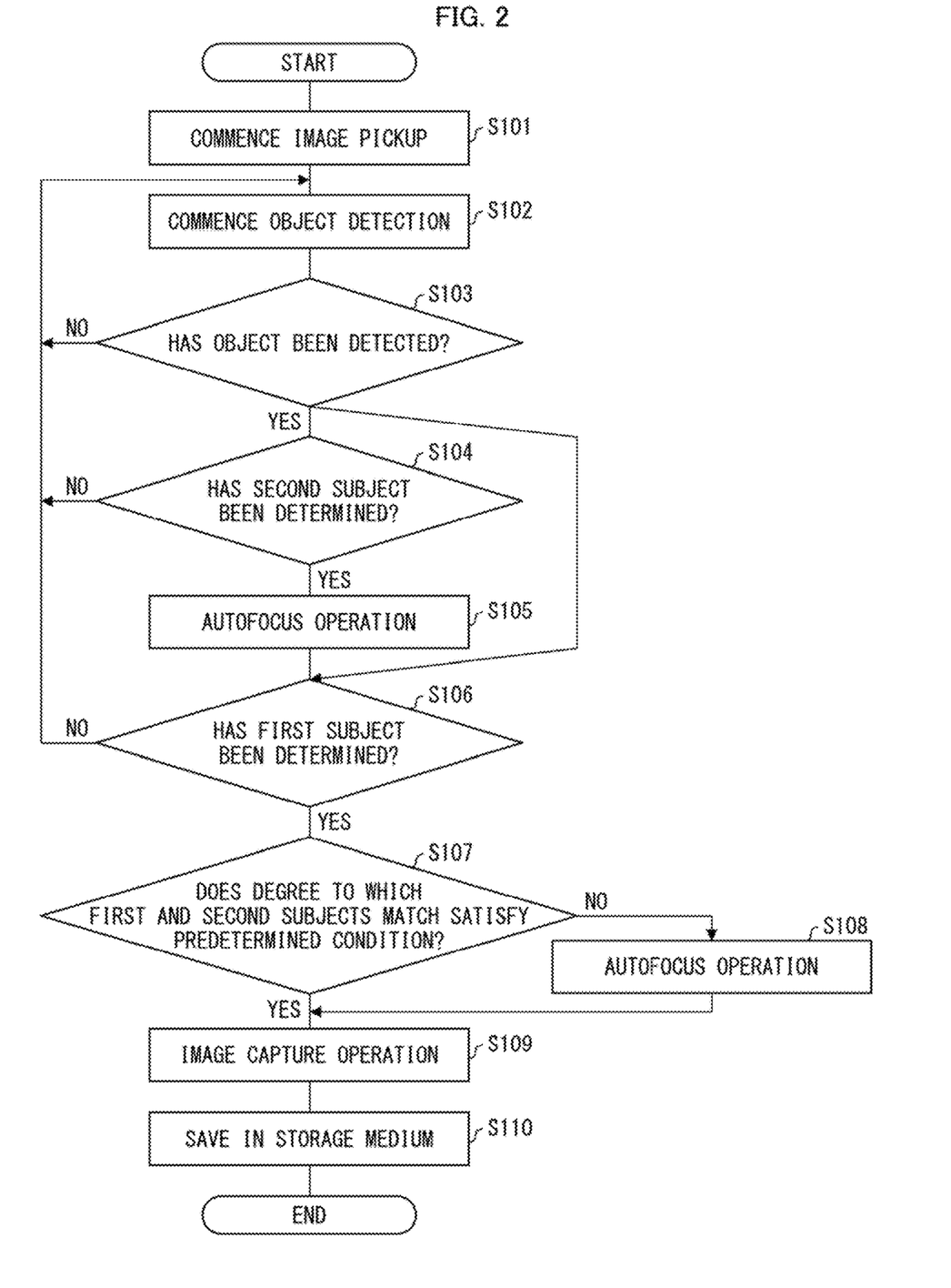
FIG. 2 is a flow chart illustrating a flow of processing in Embodiment 1.
Figure 3:
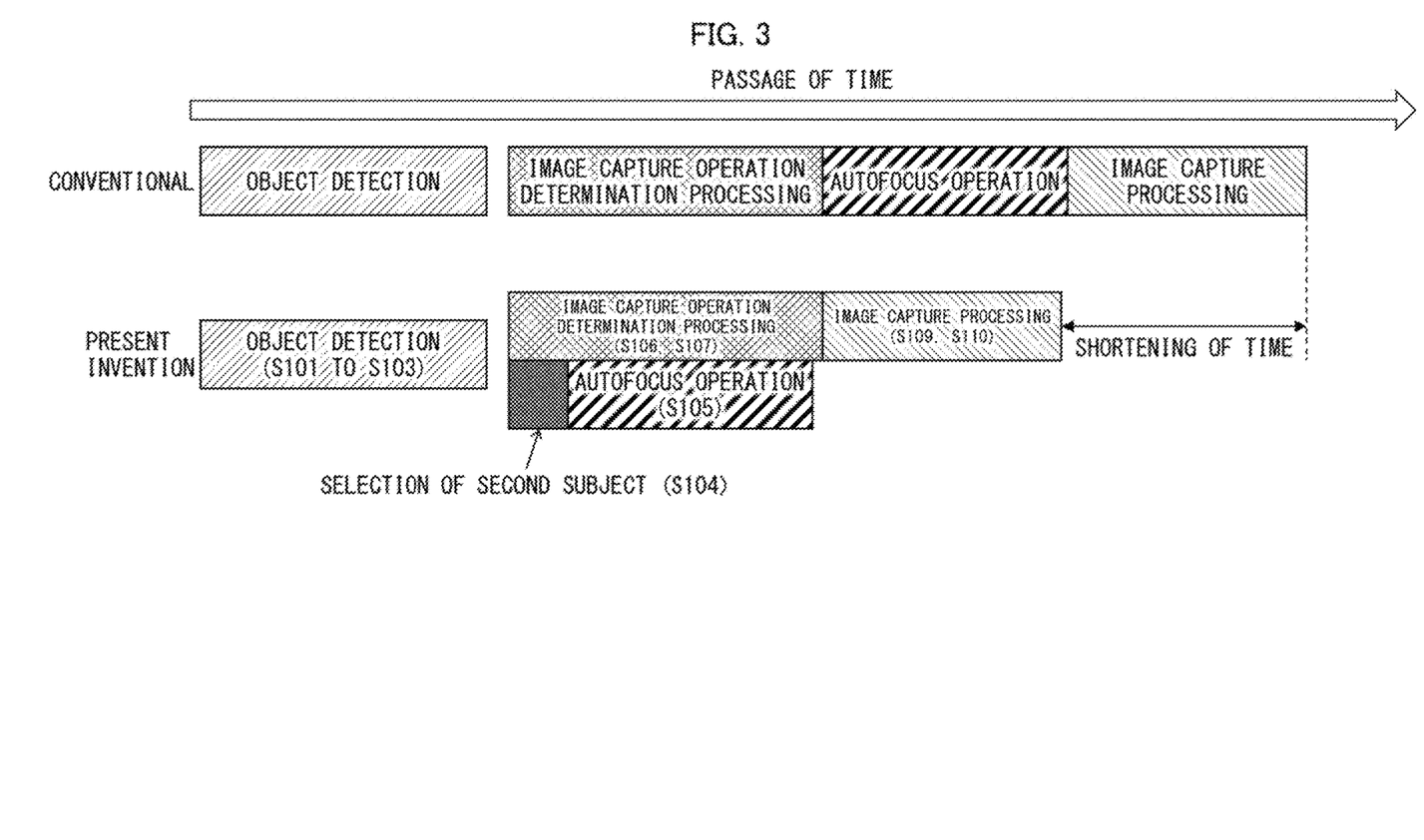
FIG. 3 is a diagram illustrating that processing carried out prior to image capture is shortened.

With reference to FIGS. 1 to 3, the following description will discuss each step of a flow of processing in Embodiment 1. FIG. 2 is a flowchart showing a flow of processing in Embodiment 1.

(Step S101)

In step S101, the image pickup processing section 14 commences image pickup by the image capture device 2. The display device 3 displays, in a screen, an image picked up by the image capture device 2. The image picked up here is typically a moving image. Image pickup processing by the image capture device 2 is continued in the subsequent steps.

(Step S102)

Next, in step S102, the object detecting section 11 attempts to detect an object in the image picked up by the image capture device 2 in step S101.

(Step S103)

Next, in step S103, the object detecting section 11 determines whether or not one or more objects have been detected in an image capture range of the image capture device 2. In a case where one or more objects have been detected, the processing of step S104 and the processing of step S106 are then carried out in parallel with each other. In a case where no object has been detected, the processing of step S102 is then carried out.

However, in a case where (i) one or more objects have been detected in step S103, (ii) prior to the current execution of step S103, step S103 has been carried out at least once before in the current process, and (iii) the processing of step S104 has finished, then only the processing of step S106 is carried out (i.e., step S104 is skipped).

Note that carrying out the processing of steps S104 and S106 in parallel means that the control device 10 carries out the autofocus processing of steps S104 and S105 (described later) in parallel with at least a part of the image capture operation determination processing of step S106 (described later).

The above configuration makes it possible for the control device 10 to execute the autofocus processing without waiting for the image capture operation determination processing to finish, and vice versa.

(Step S104)

In step S104, the autofocus processing section 13 determines whether or not the autofocus processing section 13 has determined a second subject from among the one or more objects detected by the object detecting section 11 in step S103, the second subject being an object satisfying a condition for being a target of autofocus processing. In a case where the autofocus processing section 13 has determined the second subject, the processing of step S105 is then carried out. In a case where no object in the picked up image has satisfied the condition and thus a second subject could not be determined, the processing of step S102 is then carried out.

(Step S105)

Next, in step S105, the autofocus processing section 13 carries out processing to control the image capture device 2 to focus on the second subject determined in step S104. In this way, in the autofocus processing, the processing to control the image capture device 2 to focus is commenced by the control device 10 after the second subject has been determined.

With the above configuration, a focus target of the image capture device 2 is determined by determining the second subject.

Note that the control device 10 may carry out the autoexposure processing or the auto white balance processing before, after, or in parallel with the above-described process. In other words, the control device 10 may commence at least one of the autoexposure processing and the auto white balance processing before the image capture operation determination processing in steps S106 etc. (described later) finishes.

With the above configuration, the control device 10 can carry out one of or both of the autoexposure processing and the auto white balance processing without waiting for the image capture operation determination processing to finish.

(Step S106)

In step S106, the image capture determination section determines whether or not the image capture determination section 12 has determined a first subject from among the one or more objects detected by the object detecting section 11 in step S103, the first subject being a target of the image capture operation determination processing. In a case where the image capture determination section 12 has determined the first subject, the processing of step S107 is then carried out. In a case where no object in the picked up image satisfied the condition and thus a first subject could not be determined, the processing of step S102 is then carried out.

(Step S107)

Next, in step S107, the image capture determination section 12 determines whether or not the degree to which the second subject (determined by the autofocus processing section 13 in step S104) matches the first subject (determined by the image capture determination section 12 in step S106) satisfies a predetermined condition.

In a case where the degree to which the first and second subjects match satisfies the predetermined condition, the processing of step S109 is then carried out. In a case where the degree to which the first and second subjects match does not satisfy the predetermined condition, the processing of step S108 is then carried out.

Note that in a case where the first subject has been determined but the second subject has not, the image capture determination section 12 determines the first subject to also be the second subject. In other words, in a case where the first subject is determined before the second subject is determined, the control device 10 determines the first subject to also be the second subject. The processing of step S108 is then carried out. With the above configuration, even in a case where it takes time to determine the second subject, it is possible to prevent an increase in the length of time for processing after the determination of the first subject.

In a case where (i) the image capture determination section 12 has determined that the degree to which the first and second subjects match does not satisfy the predetermined condition and (ii) the autofocus processing section 13 is currently carrying out the processing of step S105, the image capture determination section 12 causes the autofocus processing section 13 to terminate the processing of step S105. That is, in a case where the degree to which the first and second subjects match does not satisfy the predetermined condition, the control device 10 terminates the processing of controlling the image capture device 2 to focus on the second subject.

The above configuration makes it possible to reduce power consumption by stopping unnecessary processing in which the image capture device 2 is caused to focus on a subject which cannot become the first subject.

As described above, the image capture determination section 12 may determine the first subject with use of a condition that differs from the condition used by the autofocus processing section 13 for determining the second subject. In other words, the control device 10 may use different respective conditions for determining the first subject and the second subject.

With the above configuration, because the conditions for determining each subject are set to be conditions that enable quick determination, subsequent processing for each subject can be commenced quickly.

(Step S108)

In step S108, the autofocus processing section 13 carries out processing to control the image capture device 2 to focus on the first subject determined by the image capture determination section 12 in step S106, which first subject is also the second subject.

(Step S109)

In step S109, the image capture determination section 12 carries out image capture processing to control the image capture device 2 to capture a still image to be stored in the storage device 4. In a case where step S109 is reached via step S108, the image capture processing is carried out with use of a focal distance as adjusted in step S108, and in a case where step S109 is reached without step S108 being carried out, the image capture processing is carried out at with use of a focal distance as adjusted in step S105.

Processing in the latter case can also be described as processing in which, in a case where the degree to which the first and second subjects match satisfies a predetermined condition, the control device 10 controls the image capture device 2 to capture an image of the first subject in a state where the image capture device 2 is focused on the second subject.

FIG. 3 is a diagram illustrating that processing in the latter case shortens the time until image capture. As illustrated in FIG. 3, the above configuration makes it possible to reduce time lag which occurs from (i) when the subject serving as the basis of image capture timing is determined to (ii) when the image is captured.

Furthermore, in step S109, the timing of image capture carried out by the image capture device 2 is determined by the image capture determination section 12 in accordance with a state of the first subject. That is, as described above, the first subject is used as a basis for image capture timing for the image capture device 2. For example, in a case where the first subject is a person, the image capture determination section 12 may control the image capture device 2 to carry out image capture when the person smiles. The image capture determination section 12 may be configured to determine in step S106 the timing of image capture by the image capture device 2. It can be said that, with the above configuration, in a case where any object in an image obtained from the image capture device 2 has satisfied a condition for carrying out still image capture, for example, in a case where any person in the image has smiled, image capture is carried out with the object or person as the first subject.

The image pickup processing section 14 then acquires, from the image capture device 2, data indicating the still image and supplies the data to the still image encoder 15. (Step S110)

Next, in step S110, the still image encoder 15 encodes the data indicating the still image received from the image pickup processing section 14 in step S109 and stores the data thus encoded in the storage device 4.

Thus, in the above-described manner, processing is carried out as illustrated in the flowchart of FIG. 2.

In this way, the electronic device 1 in accordance with Embodiment 1 includes: at least one image capture device 2; and at least control device 10 configured to carry out: detection of one or more objects in an image obtained from the at least one image capture device 2; and image capture operation determination processing in which (i) a first subject to serve as a basis of timing of image capture by the at least one image capture device 2 is determined from among the one or more objects, without a user designating an object to be to the first subject, and (ii) timing of image capture is determined in accordance with a state of the first subject.

Furthermore, the electronic device 1 in accordance with Embodiment 1 carries out autofocus processing in which (i) a second subject, which is to be an autofocus target of the at least one image capture device 2, is determined from among the one or more objects, without the user designating an object to be the second subject, and (ii) the at least one image capture device 2 is controlled to focus on the second subject, the autofocus processing being commenced before the image capture operation determination processing finishes.

With the above configuration, because the control device 10 carries out the autofocus processing without waiting for the image capture operation determination processing to finish, it is possible to achieve the electronic device 1 which makes it possible to shorten the time until the image capture processing. The above configuration also makes it possible to eliminate effort required for a user to designate a subject.

Embodiment 2

Figure 4:
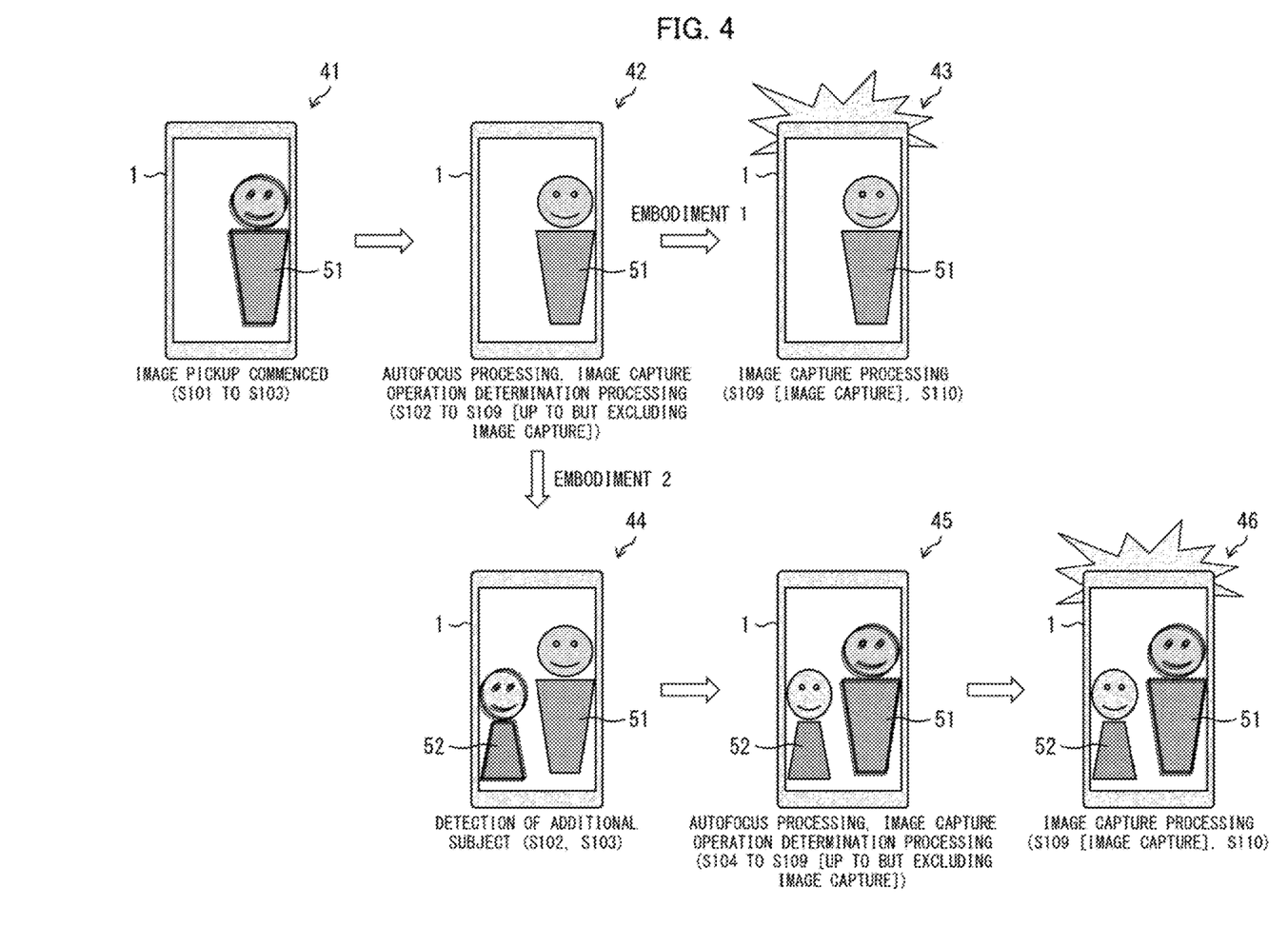
FIG. 4 is a diagram schematically illustrating operations carried out by the electronic device in each embodiment.

The following description will discuss Embodiment 2 of the present invention, with reference to FIGS. 1, 2, and 4. Embodiment 2 employs a configuration as illustrated in FIG. 1, and description will be omitted for members similar or identical to those described above. An object detecting section 11 in accordance with Embodiment 2 is configured so as to continue the processing of steps S102 and S103 (for detecting and determining an object) in subsequent steps as well, until the image capture processing of step S109 begins.

An electronic device 1 in accordance with Embodiment is configured such that the image capture operation determination processing and the autofocus processing are carried out again in a case where the object detecting section 11 has detected an additional object (i.e., subject) while the image capture determination section 12 is carrying out the image capture operation determination processing or while the autofocus processing section 13 is carrying out the autofocus processing.

Specifically, in a case where (i) the processing of step S104 or a later step as shown in the flowchart of FIG. 2 is being carried out, (ii) the image capture processing of step S109 has not yet been carried out, and (iii) the object detecting section 11 has detected an additional subject which had not been detected up to that point, the control device 10 stops the processing currently being carried out and carries out the processing of steps S104 and S106 again, in parallel. As a result of executing the processing of both steps S104 and S106 again, the first subject and/or the second subject may or may not be changed.

FIG. 4 is a diagram schematically illustrating operations carried out by the electronic device 1 in each embodiment. The processing carried out in Embodiment 1 is illustrated by processes 41 to 43 of FIG. 4. Processing carried out in Embodiment 2 is illustrated by processes 41, 42, and 44 to 46 of FIG. 4. Note that in the illustrations of processes 41 to 46, the region in which a subject 51 or 52 is shown is the display device 3 of the electronic device 1.

Specifically, in a case where the object detecting section 11 detects an additional subject 52 while the process 42 is being carried out, the flow proceeds to process 44 and subsequent processes. Note that process 42 corresponds to the processing of steps S104 to step S109, up to but excluding the image capture processing. Processes 45 and 46 of FIG. 4 illustrate an example in which autofocus processing and the image capture operation determination processing are carried out again, and as a result, image capture processing is carried out in a state where the subject 52 is being focused on.

In a case where prior to the transition to process 46, the object detecting section 11 detects yet another additional subject which had not been detected up to that point, the electronic device 1 may once again carry out process 44 and subsequent processes.

In this way, in a case where an additional subject is detected in an image obtained from the image capture device 2, the control device 10 carries out the image capture operation determination processing and the autofocus processing again. With this configuration, the image capture determination section 12 can determine the additional subject to be the first subject.

[Software Implementation Example]

Control blocks of the control device 10 (in particular, the image capture determination section 12 and the autofocus processing section 13) can be realized by a logic circuit (hardware) provided in an integrated circuit (IC chip) or the like or can be alternatively realized by software.

In the latter case, the control device 10 includes a computer that executes instructions of a program that is software realizing the foregoing functions. The computer includes, for example, at least one processor (control device) and at least one computer-readable storage medium storing the program. An object of an aspect of the present invention can be achieved by the processor of the computer reading and executing the program stored in the storage medium. The processor may be, for example, a CPU (Central Processing Unit). Examples of the storage medium encompass a non-transitory tangible medium such as read only memory (ROM), a tape, a disk, a card, a semiconductor memory, and a programmable logic circuit. The computer may further include random access memory (RAM) or the like in which the program is loaded. The program can be supplied to or made available to the computer via any transmission medium (such as a communication network or a broadcast wave) which enables transmission of the program. Note that an aspect of the present invention can also be achieved in the form of a computer data signal in which the program is embodied via electronic transmission and which is embedded in a carrier wave.

[Recap]

An electronic device (1) in accordance with Aspect 1 of the present invention includes: at least one image capture device (2); and at least one control device (10) configured to carry out the following: detection of one or more objects in an image obtained from the at least one image capture device; image capture operation determination processing in which (i) a first subject is determined from among the one or more objects, without a user designating an object to be to the first subject, and (ii) timing of image capture is determined in accordance with a state of the first subject; and autofocus processing in which (i) a second subject is determined from among the one or more objects, without the user designating an object to be the second subject, and (ii) the at least one image capture device is controlled to focus on the second subject, the autofocus processing being commenced before the image capture operation determination processing finishes.

With the above configuration, because the control device carries out the autofocus processing without waiting for the image capture operation determination processing to finish, it is possible to achieve an electronic device which makes it possible to shorten the time until the image capture processing. The above configuration also makes it possible to eliminate effort required for a user to designate a subject.

In Aspect 2 of the present invention, the electronic device of Aspect 1 may be configured such that the at least one control device carries out the autofocus processing in parallel with at least a part of the image capture operation determination processing.

The above configuration makes it possible for the control device to execute the autofocus processing without waiting for the image capture operation determination processing to finish, and vice versa.

In Aspect 3 of the present invention, the electronic device of Aspect 1 or 2 may be configured such that in the autofocus processing, processing to focus the at least one image capture device is commenced by the at least one control device after the second subject has been determined. With the above configuration, a focus target of the image capture device is determined by determining the second subject.

In Aspect 4 of the present invention, the electronic device of any one of Aspects 1 to 3 may be configured such that the at least one control device uses different respective conditions for determining the first subject and the second subject.

With the above configuration, because the conditions for determining each subject are set to be conditions that enable quick determination, subsequent processing for each subject can be commenced quickly.

In Aspect 5 of the present invention, the electronic device of any one of Aspects 1 to 4 may be configured such that in a case where a degree to which the first subject and the second subject match satisfies a predetermined condition, the at least one control device controls the at least one image capture device to capture an image of the first subject in a state where the at least one image capture device is focused on the second subject.

The above configuration makes it possible to reduce time lag which occurs from (i) when the subject serving as the basis of image capture timing is determined to (ii) when the image is captured.

In Aspect 6 of the present invention, the electronic device of any one of Aspects 1 to 5 may be configured such that in a case where an additional subject is detected in an image obtained from the at least one image capture device, the at least one control device carries out the image capture operation determination processing and the autofocus processing again.

With the above configuration, the image capture determination section can determine the additional subject to be the first subject.

In Aspect 7 of the present invention, the electronic device of any one of Aspects 1 to 6 may be configured such that in a case where the first subject is determined before the second subject is determined, the one or more control device determines the first subject to also be the second subject.

With the above configuration, even in a case where it takes time to determine the second subject, it is possible to prevent an increase in the length of time for processing after the determination of the first subject.

In Aspect 8 of the present invention, the electronic device of any one of Aspects 1 to 7 may be configured such that in a case where a degree to which the first subject and the second subject match does not satisfy a predetermined condition, the one or more control device terminates processing of controlling the at least one image capture device to focus on the second subject.

The above configuration makes it possible to reduce power consumption by stopping unnecessary processing in which the image capture device is controlled to focus on a subject which cannot become the first subject.

In Aspect 9 of the present invention, the electronic device of any one of Aspects 1 to 8 may be configured such that the at least one control device commences at least one of autoexposure processing and auto white balance processing before the image capture operation determination processing finishes.

With the above configuration, the control device can carry out one of or both of the autoexposure processing and the auto white balance processing without waiting for the image capture operation determination processing to finish.

An image capture method in accordance with Aspect 10 of the present invention is a method of image capture to be carried out by an electronic device (1) having at least one image capture device (2), the method including: a detection step of detecting of one or more objects in an image obtained from the at least one image capture device; an image capture operation determination processing step in which (i) a first subject is determined from among the one or more objects, without a user designating an object to be to the first subject, and (ii) timing of image capture is determined in accordance with a state of the first subject; and an autofocus processing step in which (i) a second subject is determined from among the one or more objects, without the user designating an object to be the second subject, and (ii) the at least one image capture device is controlled to focus on the second subject, the autofocus processing step being commenced before the image capture operation determination processing step finishes.

With the above method, because the autofocus processing step is carried out without waiting for the image capture operation determination processing step to finish, it possible to shorten the time until image capture. The above method also makes it possible to eliminate effort required for a user to designate a subject.

A control device (10) in accordance with Aspect 11 of the present invention is a control device for controlling at least one image capture device (2), the control device including: an object detecting section (11) configured to detect of one or more objects in an image obtained from the at least one image capture device; an image capture operation determination processing section (12) configured to (i) determine a first subject from among the one or more objects, without a user designating an object to be to the first subject, and (ii) determine timing of image capture in accordance with a state of the first subject; and an autofocus processing section (13) configured to (i) determine a second subject from among the one or more objects, without the user designating an object to be the second subject, and (ii) control the at least one image capture device to focus on the second subject, processing by the autofocus processing section being commenced before processing by the image capture operation determination processing section finishes.

With the above configuration, because the control device is configured such that the processing by the autofocus processing section is carried out without waiting for the processing by the image capture operation determination processing section to finish, it is possible to shorten the time until image capture. The above configuration also makes it possible to eliminate effort required for a user to designate a subject.

A control device (10) in accordance with the foregoing aspects of the present invention can be realized in the form of a computer. The scope of the present invention therefore encompasses: a control program for the control device which causes a computer to operate as each of the sections (software elements) of the control device so that the control device can be realized in the form of a computer; and a computer-readable recording medium storing the control program therein.

The present invention is not limited to the embodiments, but can be altered by a skilled person in the art within the scope of the claims. The present invention also encompasses, in its technical scope, any embodiment derived by combining technical means disclosed in differing embodiments. Further, it is possible to form a new technical feature by combining the technical means disclosed in the respective embodiments.

REFERENCE SIGNS LIST

1 Electronic device
2 Image capture device
3 Display device
4 Storage device
10 Control device
11 Object detecting section
12 Image capture determination section (image capture operation determination processing section)
13 Autofocus processing section
14 Image pickup processing section
15 Still image encoder

The invention claimed is:

1. An electronic device comprising:
at least one image capture device; and
at least one control device configured to carry out the following:
   detection of one or more objects in an image obtained from the at least one image capture device;
   image capture operation determination processing in which (i) a first subject is determined from among the one or more objects, without a user designating an object to be the first subject, and (ii) timing of image capture is determined in accordance with a state of the first subject; and
   autofocus processing in which (i) a second subject is determined from among the one or more objects, without the user designating an object to be the second subject, and (ii) the at least one image capture device is controlled to focus on the second subject,
   the autofocus processing being commenced before processing to determine the first subject in the image capture operation determination processing finishes,
   in a case where the first subject is determined before the second subject is determined, the at least one control device determining the first subject to also be the second subject.

2. The electronic device according to claim 1, wherein the at least one control device carries out the autofocus processing in parallel with at least a part of the image capture operation determination processing.

3. The electronic device according to claim 1, wherein in the autofocus processing, processing to focus the at least one image capture device is commenced by the at least one control device after the second subject has been determined.

4. The electronic device according to claim 1, wherein the at least one control device uses different respective conditions for determining the first subject and the second subject.

5. The electronic device according to claim 1, wherein in a case where a degree to which the first subject and the second subject match satisfies a predetermined condition, the at least one control device controls the at least one image capture device to capture an image of the first subject in a state where the at least one image capture device is focused on the second subject.

6. The electronic device according to claim 1, wherein in a case where an additional subject is detected in an image obtained from the at least one image capture device, the at least one control device carries out the image capture operation determination processing and the autofocus processing again.

7. An electronic device comprising:
at least one image capture device; and
at least one control device configured to carry out the following:
   detection of one or more objects in an image obtained from the at least one image capture device;
   image capture operation determination processing in which (i) a first subject is determined from among the one or more objects, without a user designating an object to be the first subject, and (ii) timing of image capture is determined in accordance with a state of the first subject; and
   autofocus processing in which (i) a second subject is determined from among the one or more objects, without the user designating an object to be the second subject, and (ii) the at least one image capture device is controlled to focus on the second subject, the autofocus processing being commenced before the image capture operation determination processing finishes, in a case where a degree to which the first subject and the second subject match does not satisfy a predetermined condition, the at least one control device terminating processing of controlling the at least one image capture device to focus on the second subject.

8. The electronic device according to claim 1, wherein the at least one control device commences at least one of autoexposure processing and auto white balance processing before the image capture operation determination processing finishes.

9. A method of image capture to be carried out by an electronic device having at least one image capture device, the method comprising:
- a detection step of detecting one or more objects in an image obtained from the at least one image capture device;
- an image capture operation determination processing step in which (i) a first subject is determined from among the one or more objects, without a user designating an object to be the first subject, and (ii) timing of image capture is determined in accordance with a state of the first subject; and
- an autofocus processing step in which (i) a second subject is determined from among the one or more objects, without the user designating an object to be the second subject, and (ii) the at least one image capture device is controlled to focus on the second subject, the autofocus processing step being commenced before processing to determine the first subject in the image capture operation determination processing step finishes, in a case where the first subject is determined before the second subject is determined, the first subject being determined to also be the second subject.

10. A control device for controlling at least one image capture device, the control device comprising:
- an object detecting section configured to detect one or more objects in an image obtained from the at least one image capture device;
- an image capture operation determination processing section configured to (i) determine a first subject from among the one or more objects, without a user designating an object to be the first subject, and (ii) determine timing of image capture in accordance with a state of the first subject; and
- an autofocus processing section configured to (i) determine a second subject from among the one or more objects, without the user designating an object to be the second subject, and (ii) control the at least one image capture device to focus on the second subject, processing by the autofocus processing section being commenced before processing by the image capture operation determination processing section to determine the first subject finishes, in a case where the first subject is determined before the second subject is determined, the first subject being determined to also be the second subject.

* * * * *